United States Patent [19]
LaCava et al.

[11] Patent Number: 5,001,927
[45] Date of Patent: Mar. 26, 1991

[54] FULL SENSING UNIT

[75] Inventors: James E. LaCava, Novi; David C. Richmond, Jackson; Norman S. Martucci, Birmingham; Peter A. Hochstein, Troy, all of Mich.

[73] Assignee: Teleflex Incorporated, Limerick, Pa.

[21] Appl. No.: 412,190

[22] Filed: Sep. 25, 1989

[51] Int. Cl.$^5$ .............................................. G08B 21/00
[52] U.S. Cl. .................................. 73/304 C; 340/620
[58] Field of Search ............. 73/291, 304 C; 361/284; 340/618, 620; 324/663, 690

[56] References Cited

U.S. PATENT DOCUMENTS

| | | | |
|---|---|---|---|
| 3,901,079 | 8/1975 | Vogel | 73/304 C |
| 4,296,472 | 10/1981 | Sarkis | 73/304 C |
| 4,296,630 | 10/1981 | Jung et al. | 361/284 |
| 4,434,657 | 3/1984 | Matsumura et al. | 73/304 C |
| 4,467,646 | 8/1984 | Berryman et al. | 73/304 C |
| 4,479,116 | 10/1984 | Kobayashi | 73/304 C |
| 4,574,328 | 3/1986 | Maier | 73/304 C |
| 4,594,892 | 6/1986 | Asmundsson | 73/304 C |

Primary Examiner—William A. Cuchlinski, Jr.
Assistant Examiner—Daniel G. DePumpo
Attorney, Agent, or Firm—Reising, Ethington, Barnard, Perry & Milton

[57] ABSTRACT

A liquid sensing assembly (10) senses the level of liquid (18) in a container (12). The assembly (10) includes a reference sensing capacitor (16) for sensing the dielectric constant of the liquid and a level sensing capacitor (14) for sensing the level of the liquid with a dielectric factor. A housing (20) forms one plate of the capacitors (14, 16), and two separate coiled wires form the second plates of the capacitors (14, 16). The capacitors (14, 16) are located within the housing (20) and separated by a seal (46) to prevent liquid from passing therethrough. The reference capacitor (16) is located in the upper end (28) of the housing (20) and receives the liquid directly at an inlet (52) and fills to overflow at an outlet (56) into the container (12). The level capacitor (16) is in the lower section of the housing (20) to sense the level in the container (12).

12 Claims, 1 Drawing Sheet

FULL SENSING UNIT

TECHNICAL FIELD

The invention relates to a capacitance gage which measures the level of a liquid by sensing change in capacitance between two plates.

BACKGROUND OF THE INVENTION

Capacitance gages have been used in a variety of vehicle environments for measuring the level of fuel in a tank. Capacitance gages have no moving parts and are therefore very reliable, especially in hostile environments where vibration and temperature extremes render mechanical level sensors useless. Capacitance gages allow for relatively simple compensation of various tank shapes, where linear changes in fluid level do not correspond to linear changes in fluid volume. Changes in dielectric constant in the medium separating the plates of the measuring capacitor will cause a change in measured capacity Air has a nominal dielectric constant equal to 1.0, and common oils or fluids, such as kerosine or gasoline have nominal dielectric constants of 2.0. Such fluids rising between two parallel plates will increase the net capacitance of the measuring cell as a function of fluid height. The fluid being measured may not vary in dielectric constant, or changes in measured capacitance may erroneously be attributed to the level changes.

Ethanol and methanol have dielectric constant of 24 and 31, respectively, and water has a dielectric constant of 78. Relatively small concentrations of these additives to gasoline will change the dielectric constant of the resulting mixture by a great amount.

There are several level sensing assemblies on the market which utilizes a level or measuring sensor capacitor and a reference capacitor which determine dielectric constant.

U.S. patent application Ser. No. 297,113, filed Jan. 13, 1989 in the name of one of the inventors, Peter A. Hochstein, named herein, discloses a capacitive liquid sensor structure and control circuit for sensing level. That control circuitry may be used in the subject invention, however, the structure of that sensor assembly is not used. The application discloses sensor assemblies which include a level or measuring capacitor and a reference capacitor. The level capacitor is mounted on the upper portion of a housing and the reference capacitor is mounted on a lower portion of the housing. Various designs are shown in the disclosure. Although it operates well, there is an operational range deficiency because after the level of liquid in the container decreases to the point below the level capacitor, the assembly will not properly indicate the amount of fuel in the tank. In other words, when the level of liquid reaches the reference capacitor below the level capacitor, the control circuitry may indicate empty even though the container remains partially filled.

Other such assemblies are disclosed in U.S. Pat. No. 3,921,451, issued Nov. 25, 1975 in the name of DiGiacomo. The application discloses the use of a level or measuring capacitor and a reference capacitor. The reference capacitor is located in the lower portion of the tank and the level sensing capacitor is located along the depth of the tank. Such an assembly allows for extensive measuring of the level of liquid, however, the reference capacitor will not always remain submerged, which is cause error in the indication of liquid level.

A third assembly is disclosed in U.S. Pat. No. 4,590,575, issued May 20, 1986 in the name of Emplit. The patent discloses a level sensing system which utilizes a reference capacitor and level or measuring capacitor. The capacitors include a probe which interacts with the walls of the tank or container to establish the capacitor. The problem with such an assembly is that the sizes of the tanks must be known since the capacitance is established between the probe and the tank walls. Such is not feasible since each tank may be of different size and of the manufacturing process, or may be made of a non-conductive material.

STATEMENT OF THE INVENTION AND ADVANTAGES

The invention is a level sensing assembly for sensing the level of liquid in a container. The assembly comprises level sensing means and reference sensing means for sensing the level of liquid in a container, and housing means for supporting the level sensing means and the reference sensing means. The assembly is characterized by including retainer means within the housing means between the level sensing means and the reference sensing means for preventing the flow of liquid therebetween.

Also included is the housing means having first and second ends and an input between said first and second ends for receiving the liquid and allowing the liquid to flow into said reference sensing means and an outlet at said first end for allowing the liquid to flow out of said sensing means.

The advantages of this type of assembly includes allowing extensive level indication of the liquid in the container, while maintaining the reference compensation by ensuring that the liquid surrounds the reference sensing means at all times.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
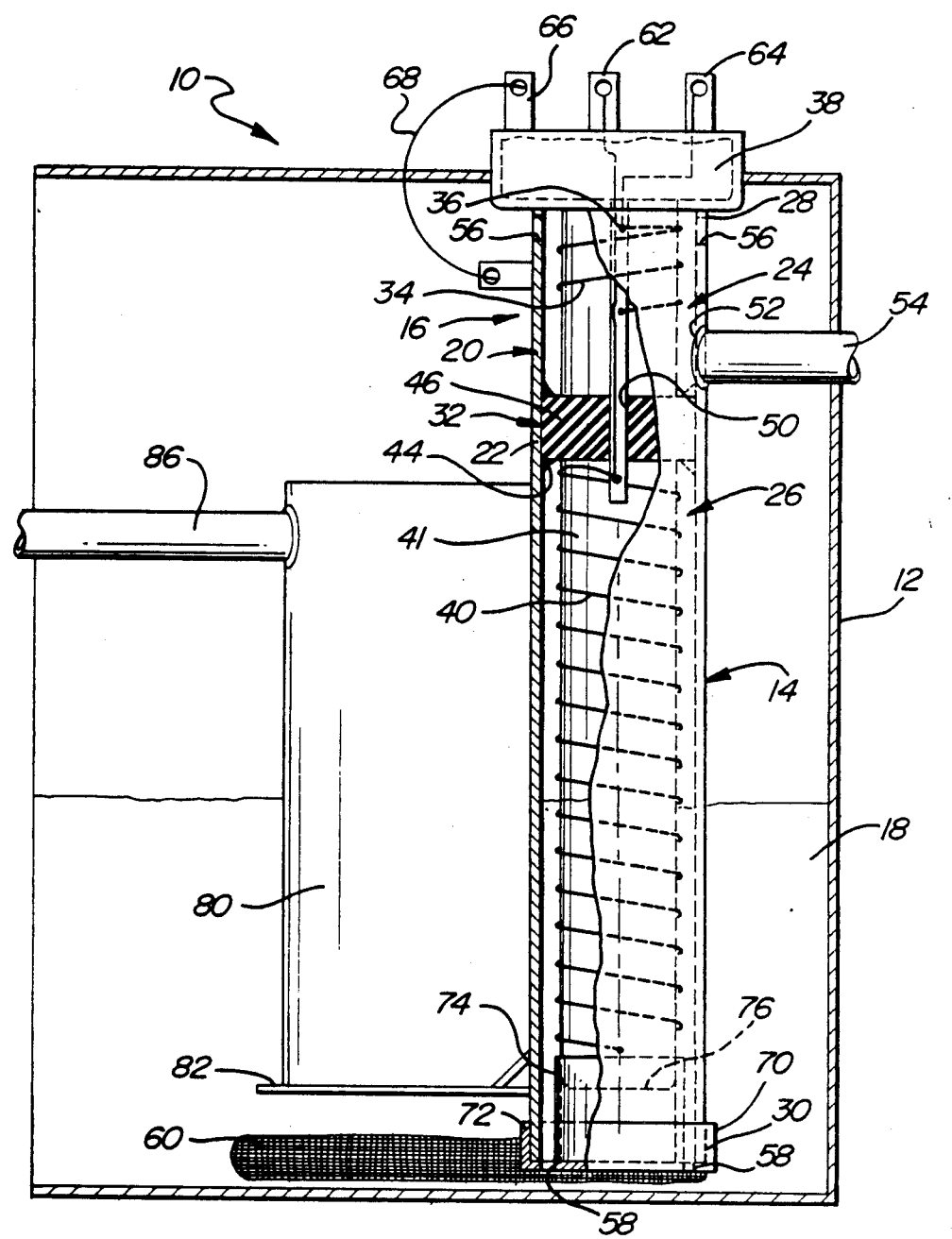
FIG. 1 is a partially broken away view of the subject invention.
Figure 2:
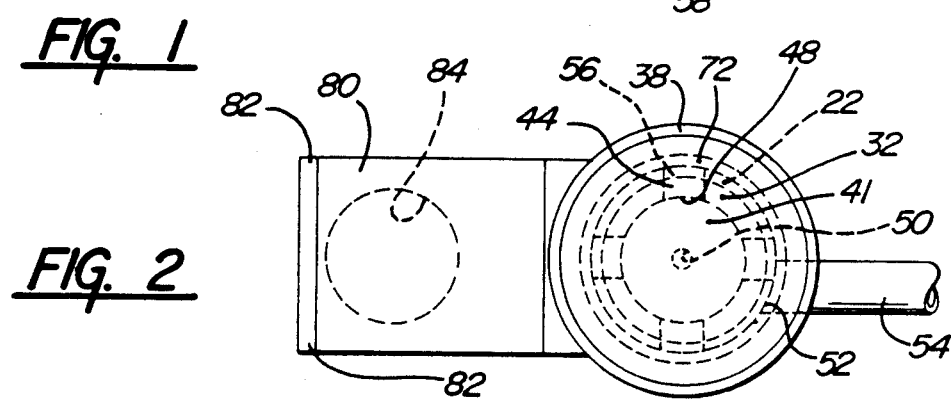
FIG. 2 is a plan view taken along lines 2—2 of FIG. 1.

A level sensing assembly for sensing the level of liquid in a container 12 is generally illustrated at 10 in FIG. 1. The assembly 10 includes level sensing means 14 and reference sensing means 16 for sensing the level of liquid 18 in a container 12. In the preferred embodiment, the liquid 18 is a type of fuel, i.e., gasoline, methanol, or the like, and the container 12 is a fuel tank.

The level sensing assembly 10 may be used with the control circuitry disclosed in the aforementioned U.S. patent application.

The level sensing means 14 and the reference sensing means 16 each produce a signal which indicate a capacitance value, and the level of fuel in the container 12 may be determined therefrom. The sensing means 14, 16 comprise two "parallel plates" to establish a capacitor. One "plate" is supplied with a positive voltage, the second "plate" is provided with ground. The "plates" may be defined by wires. The type of material between the two plates establishes a dielectric constant of which capacitance is dependent upon. Air has a dielectric constant of one (1.0) whereas fuel and other liquids have greater dielectric constants which therefor varies the capacitance value.

The reference sensing means 16 is designed to be continuously submerged in order to give a capacitance reading independent of fuel level which indicates only dielectric constant. The level sensing means 14 is designed to provide a capacitance reading which is dependent on both level and dielectric constant. Therefore, by using the reference sensing means 16, the dielectric constant term in the level sensing means 14 capacitance is known so that the level may be determined. The specific design of the two sensors 14, 16 will be subsequently described.

The assembly 10 includes housing means 20 for supporting the level sensing means 14 and the reference sensing means 16. The housing means 20 includes a hollow cylindrical member 22 having first and second 26 sections at first 28 and second 30 ends, respectively. The cylindrical member 22 in the preferred embodiment is made of stainless steel metal, but may be of any electrically conductive material. The reference sensing means 16 is located in the first section 24 and the level sensing means 14 is located at the second section 26. The cylindrical member 22 provides one of the plates for the reference sensing means 16 and the level sensing means 14.

The assembly 10 includes sealing means 32 within the cylindrical member 22 located between the level sensing means 14 and the reference sensing means 16 for preventing the flow of liquid therebetween. The sealing means 32 establishes and divides the first 24 and second 26 sections of the cylindrical member 22.

The reference sensing means 16 includes a reference plate 34 within the first section 24 for establishing a capacitance between the cylindrical member 22 and the reference plate 34. In the preferred embodiment, the reference plate 34 comprises a coiled wire in the interior of the cylindrical member 22 in the first section 24 having an end 36 connected to an adaptor 38 for supplying current therethrough to establish the capacitance with the stainless steel walls of the cylindrical member 22. The level sensing means 14 includes a level plate 40 within the second section 26 for establishing a capacitance between the cylindrical member 22 and the level plate means 40. The level plate 40 is similar to the reference plate 34 in that it includes a coiled wire which acts with the stainless steel walls of the cylindrical means 22 to establish the capacitance.

The assembly 10 includes a core element 41 which is generally a solid cylinder manufactured from plastic or other non-conductive material. The core element 41 is inserted within the cylindrical member 22, and the wires 34, 40 are wound or coiled thereabout.

The sealing means 32 includes a plurality of circumferentially spaced tabs 44 projecting radially inwardly from the interior of the walls of the cylindrical member 22. Also included is a seal 46, such as a rubber ring, which is sized to fit tightly about the core element 41 and within the cylindrical member 22 to prevent the liquid from flowing thereabout. The seal 46 includes a hole 48 longitudinally therethrough for allowing the core element 41 to pass therethrough.

The core element 41 includes a hollow tube 50 which extends from the adapter 38 partially into the second section 26 to allow the wires of the reference plate 34 and of the level plate 40 to extend from the adapter 38 to the reference sensing means 16 and the level sensing means 14, respectively. The core element 41 allows each wire 34, 40 to extend out from the tube 50 through the plastic to establish the sensing means 14, 16.

The first section 24 of the cylindrical member 22 includes an inlet 52 adjacent and above the seal 46 for receiving the flow of liquid into the first section 24. In the preferred embodiment, the inlet 52 is generally connected to the fuel return line 54 from the engine compartment of a car. As commonly known in automotive engines, fuel injection systems all use circulatory fuel to cool the injector and fuel rail. A fuel pump 80 is supported by a flange 82 to receive the fluid from an aperture 84 and pump the fuel through the hose 86 to the engine of the vehicle. The fuel pump 80 capacity is very great compared to the small amount used by the engine, therefore, most of the fuel is recirculated. Therefore, the return line 54 receives the recirculated fuel, or liquid.

The first section 24 also includes a plurality of outlets 56 spaced from and above the inlet 52 and adjacent the first end 28 to allow liquid to overflow and flow out of the first section 24 into the container 12. Therefore, the recirculated fuel flowing into the inlet 52 flows through the reference sensing means 16 and into the container 12 via the outlets 56. The reference sensing means 16 will always be surrounded by liquid to obtain accurate reference measure of the capacitance indicative of dielectric constant.

The adaptor 38 is connected to the first end 28 of the cylindrical member 22 and receives the wires of the level plate 40 and reference plate 34 at first 62 and second 64 connectors, and is adapted to be connected to the control circuitry as disclosed in the aforementioned United States patent application to provide an output indicative of level. A ground connector 66 is connected to the cylindrical member 22 via a conductor 68 to ground the cylindrical member 22.

The second end 30 of the cylindrical member 22 is generally an open hollow end which allows the flow of liquid up into the cylindrical member 22 and out as the level of liquid decreases. The housing means 14 includes a cap member 70 fitted about the second end 30 of the cylindrical member 22 having sides 72 extending radially about the second end 30. Also included is a plug 74 extending into the cylindrical member 22 and having a cavity 76 receiving the end of the core element 41. The cap member 70 includes a plurality of apertures 58 for allowing the liquid to flow into the cylindrical member 22 and to the level sensing means 14. The level of liquid within the cylindrical member 22 of the second section 26 will remain equivalent to the level of liquid in the container 12 outside of the housing means 20. The maximum level of the liquid will be approximately at the seal 40 to allow indication of the actual level. Therefore, the length of the level sensing means 14 will be dependent upon the maximum level.

Also included is screen 60 attached to the cap member 70 about the aperture 58 for preventing residue to flow into the second section 26 and level sensing means 14. In the preferred embodiment, the screen 60 allows only the gas or fuel to flow into the housing means 14 while preventing water and dirt from entering therein.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A level sensing assembly for sensing the level of liquid in a surrounding container, said assembly comprising; level sensing means (14) and reference sensing means (16) for sensing the level of liquid in a container (12), housing means (20) for supporting said level sensing means (14) and said reference sensing means (16), sealing means (32) within said housing means (20) between said level sensing means (14) and said reference sensing means (16) for preventing the flow of liquid therebetween, said housing means (20) comprising a longitudinally extending hollow cylinder (22) having first (28) and second (30) ends spaced longitudinally apart, said hollow cylinder (22) including a first section (24) at said first end (28) and a second section (26) at said second end (30) with said sealing means (32) therebetween, said reference sensing means (16) being disposed in said first section (24) and said level sensing means (14) being disposed in said second section (26) spaced longitudinally from said reference sensing means (16) for placement in liquid in the container (12).

2. An assembly as set forth in claim 1 further characterized by said first section (24) including an inlet (52) adjacent said sealing means (32) for receiving the flow of the liquid into said first section (24).

3. An assembly as set forth in claim 2 further characterized by said first section (24) including an outlet (56) adjacent said first end (28) to allow liquid to overflow out of said first section (24) from said reference sensing means (16) and into the surrounding container (12).

4. An assembly as set forth in claim 3 further characterized by said reference sensing means (16) including a reference plate (34) within said first section (24) for establishing a capacitance between said housing means (20) and said reference plate (34).

5. An assembly as set forth in claim 4 further characterized by said second section (26) having an aperture (58) at said second end (30) for allowing liquid from the surrounding container (12) to seek its own level in said second section (26).

6. An assembly as set forth in claim 5 further characterized by including screen means (60) at said aperture (58) for preventing residue from flowing into said second section (26).

7. An assembly as set forth in claim 6 further characterized by said level sensing means (14) including a level plate (40) within said second section (26) for establishing a capacitance between said housing means (20) and said level plate (40).

8. An assembly as set forth in claim 7 further characterized by said sealing means (32) including a pair of spaced tabs (44) extending inwardly from said hollow cylinder (22).

9. An assembly as set forth in claim 8 further characterized by said sealing means (32) including a seal (46) between said tabs (44) to prevent liquid from flowing between said reference sensing means (16) and said level sensing means (14).

10. A level sensing assembly for sensing the level of liquid in a container (12), said assembly comprising; level sensing means (14) and reference sensing means (16) for sensing the level of liquid in a container (12), housing means (20) having first (28) and second (30) ends for supporting said level sensing means (14) at said second end (28) and said reference sensing means (16) at said first end (30), said assembly characterized by said housing means (20) including an input (52) between said first and second ends for receiving and allowing the liquid to flow into said reference sensing means (16) and an outlet at said first end (28) spaced longitudinally from said inlet (52) along said housing means (20) for allowing the liquid to flow out of said housing means (20) and to said level sensing means (14).

11. An assembly as set forth in claim 10 further characterized by including sealing means (32) within said housing means (20) between said level sensing means (14) and said reference sensing means (16) for preventing the flow of liquid therebetween.

12. A level sensing assembly for sensing a level of liquid in a surrounding container, said assembly comprising; level sensing means (14) and reference sensing means (16) for sensing a level of liquid in a container (12), housing means (20) for supporting said level sensing means (14) and said reference sensing means (16), sealing means (32) within said housing means (20) between said level sensing means (14) and said reference sensing means (16) for preventing the flow of liquid therebetween, said housing means (20) including a first section (24) for supporting said reference sensing means (16) and a second section (26) for supporting said level sensing means (14) with said sealing means (32) therebetween, said first section (24) including an inlet (52) adjacent said sealing means (32) for receiving the flow of the liquid into said first section (24) and an outlet (56) adjacent said first end (28) to allow liquid to overflow out of said first section (24) from said reference sensing means (16) and into the surrounding container (12).

* * * * *